United States Patent
Fujimori et al.

(10) Patent No.: US 7,009,942 B2
(45) Date of Patent: Mar. 7, 2006

(54) CONNECTION SETTING APPARATUS

(75) Inventors: Junichi Fujimori, Hamamatsu (JP); Hirotaka Kuribayashi, Hamamatsu (JP); Yoshinari Nakamura, Hamamatsu (JP); Tatsutoshi Abe, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 775 days.

(21) Appl. No.: 09/761,882

(22) Filed: Jan. 17, 2001

(65) Prior Publication Data

US 2001/0021188 A1    Sep. 13, 2001

(30) Foreign Application Priority Data

Jan. 17, 2000  (JP)  .............................. 2000-010314

(51) Int. Cl.
  *H04L 12/26*  (2006.01)
  *G06F 17/00*  (2006.01)
(52) U.S. Cl. ...................................... 370/254; 715/735
(58) Field of Classification Search ................ 370/252, 370/389, 254; 715/735–740; 725/131
  See application file for complete search history.

(56) References Cited

U.S. PATENT DOCUMENTS

| 5,471,539 A | 11/1995 | Flum et al. |
| 5,883,621 A * | 3/1999 | Iwamura ..................... 715/735 |

FOREIGN PATENT DOCUMENTS

| JP | 11-168489 | 6/1999 |
| JP | 11-205313 | 7/1999 |
| WO | WO 97/49057 | 12/1997 |
| WO | WO 99/06910 | 2/1999 |
| WO | WO 99/59309 | 11/1999 |

OTHER PUBLICATIONS

The Facts About FireWire, Ingrid J. Wickelgren, Apr. 1997.

\* cited by examiner

*Primary Examiner*—Steven Nguyen
(74) *Attorney, Agent, or Firm*—Morrison & Foerster LLP

(57) ABSTRACT

A connection setting apparatus having a connection information acquiring unit for acquiring first connection information from a plurality of apparatus connected to a network, each apparatus having at least one line, and a generating unit for generating second connection information in accordance with the acquired first connection information.

15 Claims, 12 Drawing Sheets

FIG. 4A

| <MIDI> | <AUDIO> | | |
|---|---|---|---|
| [from] | | [to] | |
| LINE NAME | APPARATUS NAME | LINE NAME | APPARATUS NAME |
| MIDIout1 | MD1 | ---------- | ---------- |
| MIDIout2 | ---------- | ---------- | ---------- |
| MIDIout3 | ---------- | ---------- | ---------- |
| | | MIDIin1 | |
| | | MIDIin2 | MD2 |
| | | MIDIin3 | MD3 |

FIG. 4B

| <MIDI> | <AUDIO> | | |
|---|---|---|---|
| [from] | | [to] | |
| LINE NAME | APPARATUS NAME | LINE NAME | APPARATUS NAME |
| AUDIOout1 | AD1 | ---------- | ---------- |
| AUDIOout2 | ---------- | ---------- | ---------- |
| AUDIOout3 | ---------- | ---------- | ---------- |
| | | AUDIOin1 | |
| | | AUDIOin2 | AD2 |
| | | AUDIOin3 | |

FIG. 5A

| <MIDI> | <AUDIO> | | |
|---|---|---|---|
| [from] | | [to] | |
| LINE NAME | APPARATUS NAME | LINE NAME | APPARATUS NAME |
| MIDIout1 | MD1 | MIDIin2 | MD2 |
| | | MIDIin3 | MD3 |
| MIDIout2 | ---------- | ---------- | ---------- |
| MIDIout3 | ---------- | ---------- | ---------- |
| | | MIDIin1 | |
| | | MIDIin2 | MD2 |
| | | MIDIin3 | MD3 |

FIG. 5B

| <MIDI> | <AUDIO> | | |
|---|---|---|---|
| [from] | | [to] | |
| LINE NAME | APPARATUS NAME | LINE NAME | APPARATUS NAME |
| AUDIOout1 | AD1 | AUDIOin2 | AD2 |
| AUDIOout2 | ---------- | ---------- | ---------- |
| AUDIOout3 | ---------- | ---------- | ---------- |
| | | AUDIOin1 | ---------- |
| | | AUDIOin2 | AD2 |
| | | AUDIOin3 | |

FIG. 6A

| SERIAL PORT | IF1 |
|---|---|
| OTHER TERMINALS | |

FIG. 6B

| SERIAL PORT | PC |
|---|---|
| IEEE1394(mLAN)1 | IF2 |
| IEEE1394(mLAN)2 | |
| MIDIin | MD1 |
| MIDIout | |
| AUDIOin | AD1 |
| AUDIOout | |

FIG. 6C

| SERIAL PORT | |
|---|---|
| IEEE1394(mLAN)1 | IF1 |
| IEEE1394(mLAN)2 | IF3 |
| MIDIin | |
| MIDIout | MD2 |
| AUDIOin | |
| AUDIOout | AD2 |

FIG. 6D

| SERIAL PORT | |
|---|---|
| IEEE1394(mLAN)1 | |
| IEEE1394(mLAN)2 | IF2 |
| MIDIin | |
| MIDIout | MD3 |
| AUDIOin | |
| AUDIOout | |

FIG. 7A

| MIDIin1  |         |
|----------|---------|
| MIDIout1 | MIDIin  |
| AUDIOin1 |         |
| AUDIOout1| AUDIOin |

FIG. 7B

| MIDIin2  | MIDIout |
|----------|---------|
| MIDIout2 |         |
| AUDIOin2 | AUDIOout|
| AUDIOout2|         |

FIG. 7C

| MIDIin3  | MIDIout |
|----------|---------|
| MIDIout3 |         |
| AUDIOin3 |         |
| AUDIOout3|         |

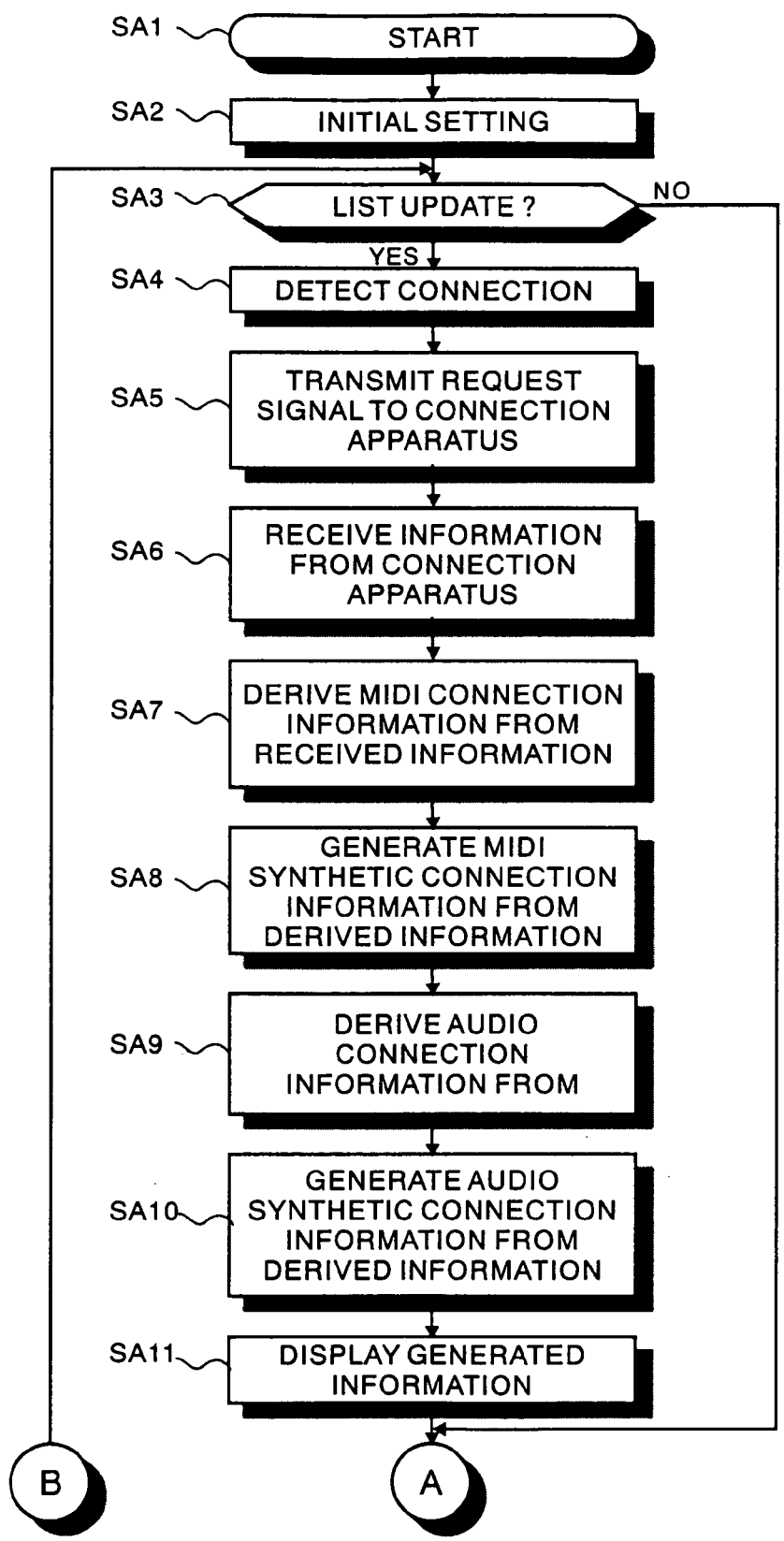

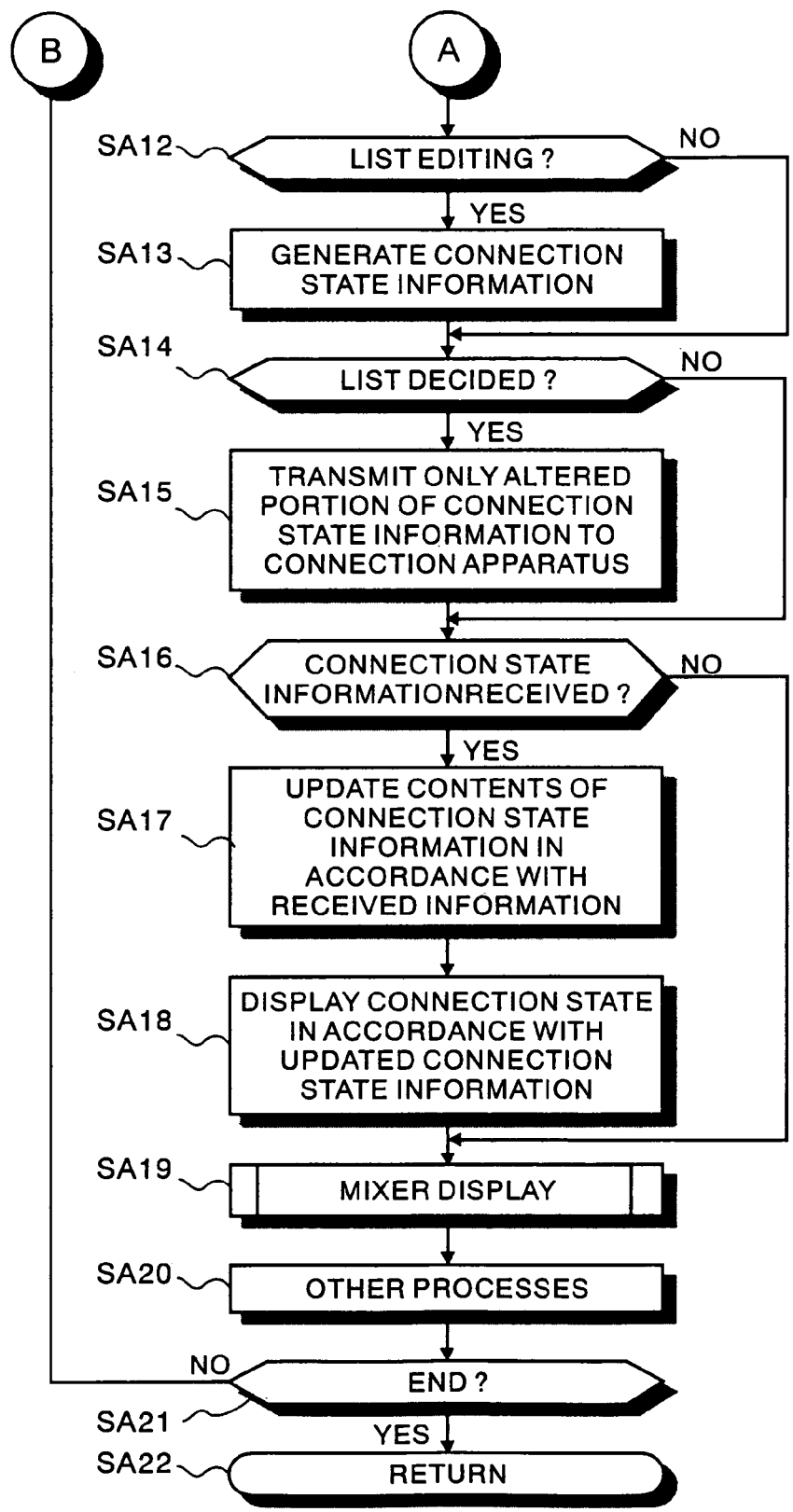

FIG. 10A

| LINE NAME | APPARATUS NAME |
|---|---|
| MIDIin1 | |
| MIDIin2 | MD2 |
| MIDIin3 | MD3 |
| MIDIout1 | MD1 |
| MIDIout2 | |
| MIDIout3 | |

FIG. 10B

| LINE NAME | APPARATUS NAME |
|---|---|
| AUDIOin1 | |
| AUDIOin2 | AD2 |
| AUDIOin3 | |
| AUDIOout1 | AD1 |
| AUDIOout2 | |
| AUDIOout3 | |

FIG. 11A

| from | to |
|---|---|
| MIDIout1 | MIDIin2    MIDIin3 |
| MIDIout2 | |
| MIDIout3 | |

FIG. 11B

| from | to |
|---|---|
| AUDIOout1 | AUDIOin2 |
| AUDIOout2 | |
| AUDIOout3 | |

CONNECTION SETTING APPARATUS

This application is based on Japanese Patent Application 2000-010314, filed on Jan. 17, 2000, the entire contents of which are incorporated herein by reference.

BACKGROUND OF THE INVENTION a) Field of the Invention

The present invention relates to a connection setting apparatus for setting connections between a plurality of apparatus connected to a network.

b) Description of the Related Art

Developments on networks allow recent electronic musical instruments to play an isochronous performance. As an example of the standard communication specifications for electronic musical instruments, MIDI (musical instrument digital interface) is known. A higher speed isochronous performance is not possible by using electronic musical instruments, tone signal processors and the like in conformity with the high speed network specifications such as USB and IEEE1394.

Of the IEEE1394 specifications, "Specification for Audio and Music Data Transmission" (hereinafter called mLAN) can realize digital audio data transmission of 256 to 354 channels and music data transmission corresponding to 256 MIDI cables, by using one channel.

If MIDI cables and audio cables are used for interconnection of a plurality of electronic musical instruments and tone signal generators configuring a network, the number of cables increases greatly and wiring becomes very complicated.

If the number of terminals mounted on each MIDI apparatus or audio apparatus is small, desired connections may become impossible.

It is also necessary that each apparatus is set so that what type of data transferred between apparatus is processed at each apparatus. This setting work is required to set the connection state of each apparatus while the connection states of other apparatus are taken into consideration.

SUMMARY OF THE INVENTION

It is an object of the present invention to facilitate setting of connections between a plurality of apparatus on a network and setting of transmission/reception of data.

According to one aspect of the present invention, there is provided a connection setting apparatus comprising: connection information acquiring means for acquiring first connection information from a plurality of apparatus connected to a network, each apparatus having at least one line; and generating means for generating second connection information in accordance with the acquired first connection information.

According to another aspect of the present invention, there is provided a connection setting apparatus comprising: connection information acquiring means for acquiring first connection information from a plurality of apparatus connected to a network; generating means for generating second connection information in accordance with the acquired first connection information; editing means for editing the second connection information; transmitting means for transmitting connection information, the transmitting means having an anisochronous port and an isochronous port; receiving means for receiving the transmitted second connection information; and information processing means for processing information in accordance with the received second connection information.

Transmission/reception of a plurality type of data such as MIDI data and audio data can be collectively set by one apparatus. Setting of the connections between connection apparatus, therefore, becomes very easy.

According to another aspect of the present invention, there is provided a connection setting apparatus comprising: detecting means for detecting an apparatus connected to a network; mixer display means for displaying a mixer of a detected apparatus; editing mans for editing mixing information in accordance with the displayed mixer; and transmitting means for transmitting the edited mixing information.

According to the invention, transmission/reception of a plurality type of data can be collectively set by one apparatus.

Further, according to the invention, setting of connections of connection apparatus is very easy.

Still further, according to the invention, a plurality of apparatus can be connected even if each apparatus has a small number of terminals mounted.

BRIEF DESCRIPTION OF THE DRAWINGS

FIGS. 4A and 4B are lists showing the connection states of the mLAN system shown in FIG. 1.

FIGS. 5A and 5B are lists showing the connection states of the mLAN system shown in FIG. 1.

FIGS. 6A to 6D are conceptual diagrams showing apparatus information.

FIGS. 7A to 7C are conceptual diagrams showing connection information.

FIG. 8 is a flow chart illustrating a connection control process to be executed by CPU.

FIG. 9 is a flow chart illustrating a connection control process to be executed by CPU.

FIGS. 10A and 10B are conceptual diagrams showing synthetic connection information.

FIGS. 11A and 11B are conceptual diagrams showing connection state information.

DETAILED DESCRIPTION OF THE PREFERRED EMBODIMENTS

Figure 1:
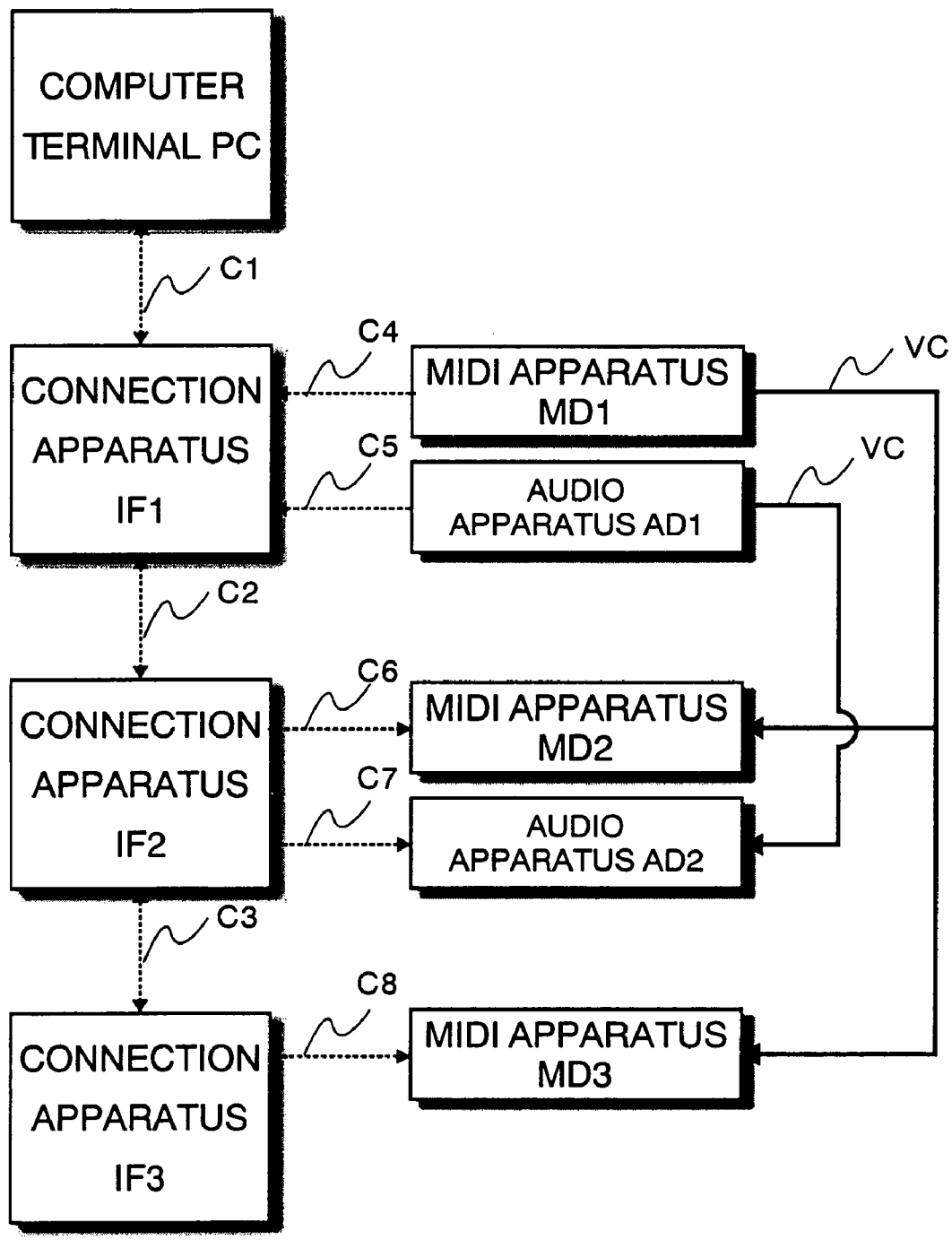
FIG. 1 is a connection diagram of an mLAN system according to an embodiment of the invention.

FIG. 1 is a connection diagram of a mLAN system using IEEE1394 according to an embodiment. In FIG. 1, broken lines indicate physical connections between physical terminals of a plurality of nodes, the physical connections being realized by cables or the like. Bold lines VC indicate virtual connections set by a user, the virtual connections being described later.

The physical terminal is a terminal used for physical connection to another apparatus by using a cable or the like, such as MIDIin/MIDIout terminals and AUDIOin/AU- DIOout terminals. Physical connection also includes connection realized by infrared rays or radio waves, and ports for such connection are also physical terminals.

In this embodiment, instead of connecting desired nodes by using physical terminals, IEEE1394 (mLAN) ports are used to virtually set data transmission/reception between those nodes not directly connected. With this setting, various types of data such as music data including MIDI signals and video data are transmitted and received via the network. Such connection between specific nodes providing the same effect as the connection by cables or the like is called virtual connection. Namely, although MIDI and AUDIO physical terminals and the like other than IEEE1394 ports and serial ports at respective nodes are not actually connected, communication between these nodes is possible as if they are physically connected.

In the mLAN system, of a number of nodes interconnected serially or in a tree structure, those nodes connected by IEEE1394 cables can communicate each other. By utilizing this, the virtual connection is realized.

A computer terminal PC may be a personal computer or general purpose computer to be described later with reference to FIG. 2. In this embodiment, the computer terminal PC is connected to a connection apparatus IF1 by a serial cable indicated by a broken line C1. If the computer terminal PC has an IEEE1394 (mLAN) interface, the computer terminal PC may be connected to IF1 by using an IEEE1394 cable (mLAN cable).

The connection apparatus IF1, IF2 and IF3 have at least an IEEE1394 (mLAN) interface to be described later with reference to FIG. 3. In this embodiment, each of the connection apparatus IF1, IF2 and IF3 has a MIDI interface capable of transmission/reception of MIDI data, an audio interface capable of transmission/reception of music data (audio data and the like) and the like. The connection apparatus IF1 has a serial interface for connection to the computer terminal PC and the like.

The connection apparatus IF1 is connected to the connection apparatus IF2 by an IEEE1394 cable (mLAN cable) as indicated by a broken line C2. A MIDI apparatus MD1 is connected to a MIDIin terminal of the connection apparatus IF1 by using a MIDI cable as indicated by a broken line C4, and to an AUDIOin terminal of the connection apparatus IF1 by a digital cable as indicated by a broken line C5.

The MIDI apparatus MD1 is an electronic musical instrument or the like provided with at least a MIDI interface. For example, the MIDI apparatus MD1 is a keyboard for a keyed instrument, a pad for a percussion instrument or the like. Any other MIDI apparatus may also be used so long as they can generate and output MIDI data. Obviously, the MIDI apparatus MD1 can reproduce musical program data from MIDI data. MIDI data may be input by a user or automatically generated by computer software.

In this embodiment, the MIDI apparatus MD1 has the MIDI Interface and is connected to the MIDIin terminal of the connection apparatus IF1. The MIDI apparatus MD1 is used for inputting (transmitting) MIDI data via the connection apparatus IF1 to the mLAN system shown in FIG. 1.

The audio apparatus AD1 is an acoustic instrument having at least audio data input/output terminals, for example, a CD player or the like. Any other audio apparatus may also be used so long as they can generate or reproduce musical tones and output them, such as an electronic musical instrument having a built-in tone generator, an automatic music performance player or the like (keyed instrument, stringed instrument, wind instrument, percussion instrument or the like).

In this embodiment, the audio apparatus AD1 has a digital audio interface and is connected to a DIGITALin (AUDIOin) of the connection apparatus IF1. The audio apparatus AD1 is used for inputting (transmitting) audio data via the connection apparatus IF1 to the mLAN system shown in FIG. 1.

The connection apparatus IF2 connected to the connection apparatus IF1 is also connected to the connection apparatus IF3 by an IEEE1394 cable (mLAN cable) as indicated by a broken line C3. A MIDI apparatus MD2 is connected to a MIDIout terminal of the connection apparatus IF2 by a MIDI cable as indicated by a broken line C6, and to an AUDIOout terminal of the connection apparatus IF2 by a digital cable as indicated by a broken line C7.

The MIDI apparatus MD2 is an electronic musical instrument or the like having a built-in tone generator, an automatic music performance player or the like provided with at least a MIDI interface. Any other MIDI apparatus may be used so long as they can generate or edit musical tones from received MIDI data and output them.

In this embodiment, the MIDI apparatus MD2 has a MIDI interface and is connected to the MIDIout terminal of the connection apparatus IF2. The MIDI apparatus MD2 is used for receiving MIDI data from the mLAN system shown in FIG. 1 via the connection apparatus IF2, reproducing musical program data from the received MIDI data, and performing other operations.

The audio apparatus AD2 is an acoustic instrument having at least audio data input/output terminals. Any audio apparatus may be used so long as they can reproduce, edit and record input musical tone data (audio data). For example, the audio apparatus AD2 may be a personal computer provided with an audio input terminal, or the like.

In this embodiment, the audio apparatus AD2 has a digital audio interface and is connected to a DIGITALout (AUDIOout) terminal of the connection apparatus IF2 by a digital cable. The audio apparatus AD2 is used for receiving audio data from the mLAN system shown in FIG. 1 via the connection apparatus IF2, reproducing musical program data from the received audio data, and performing other operations.

The connection apparatus IF3 is connected to the connection apparatus IF2 by an IEEE1394 cable (mLAN cable) indicated by a broken line C3. A MIDI apparatus MD3 is connected to the MIDIout terminal of the connection apparatus IF3 by a MIDI cable indicated by a broken line C8.

The MIDI apparatus MD3 is an electronic musical instrument or the like having a built-in tone generator, an automatic music performance player or the like provided with at least a MIDI interface. The MIDI apparatus MD3 is similar to the MIDI apparatus MD2.

MIDI data and musical tone data (audio data) as well as apparatus information and connection information of each apparatus to be described later can be transferred between any pair of the connection apparatus IF1, IF2 and IF3 connected together by the IEEE1394 cables (mLAN cables) indicated by the broken lines C2 and C3.

Transmission data is added with identification data representative of a data source or data destination. Each apparatus refers to this identification data to judge whether the transmission data is received at the apparatus, and receives only the transmission data judged as necessary for the apparatus.

In this mLAN system, MIDI data or audio data for musical program reproduction is transmitted as isochronous data after it is added with the information indicating that the data is the isochronous data. This isochronous data has a priority over anisochronous data to be later described. In transmission/reception of isochronous data, a real time performance is regarded as important so as not to broken musical performance, and a data transmission completion is not checked.

The apparatus information and connection information of each apparatus are transmitted as anisochronous data after it is added with the information indicating that the data is the anisochronous data. In transmission/reception of the anisochronous data, a reliable data transmission/reception is regarded as important. After the data is once transmitted, it is checked whether the data was correctly transmitted, and if there is an error, the data is again transmitted. The anisochronous data has a lower priority than the isochronous data, and is transmitted during the period while the isochronous data is not transmitted or during other periods.

Figure 2:
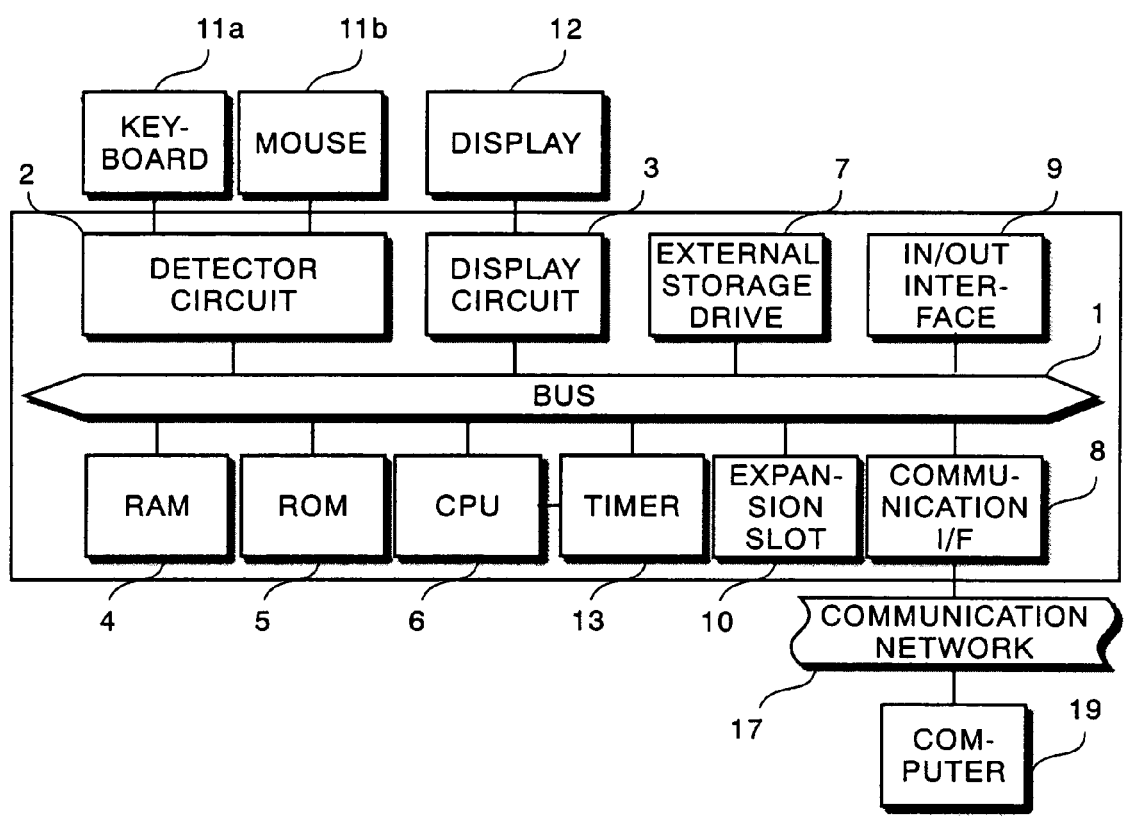
FIG. 2 is a block diagram showing the fundamental structure of a computer terminal PC or personal computer constituting the mLAN system shown in FIG. 1.

FIG. 2 is a block diagram showing the fundamental structure of the computer terminal PC or a personal computer PC constituting the mLAN system shown in FIG. 1.

Connected to a bus 1 are a detector circuit 2, a display circuit 3, a RAM 4, a ROM 5, a CPU 6, an external storage drive 7, a communication interface 8, an IN/OUT interface 9, an expansion slot 10, and a timer 13.

Setting, alteration and the like of the connection information can be designated by a user using an input device such as a keyboard 11a and a mouse 11b connected to the detector circuit 2. Any other input devices such as a musical instrument keyboard and switches may be used so long as they can output a signal corresponding to an input by a user.

The display circuit 3 is connected to a display 12 on which the connection state of each apparatus and the like can be displayed. A user refers to the connection state or the like displayed on the display 12 to edit the connection state or the like. By displaying the connection state on the display and editing the connection state on the display, the user can intuitively understand the connection state of the mLAN system and intuitively edit the connection state. Operational performance of the system can therefore be improved.

The connection diagram of the connection state of the mLAN system shown in FIG. 1 may be displayed on the display 12, or a list such as shown in FIGS. 4A and 4B may be displayed. Both the connection diagram and list may be displayed side by side on the display 12. If necessary, a plurality of windows may be displayed. In displaying the connection information, the list or connection diagram is preferable. Other display methods of displaying the connection state of the mLAN system may also be used.

In displaying the connection diagram such as shown in FIG. 1, the connection diagram excepting the bold lines VC is first displayed as an initial display screen in accordance with the apparatus information and connection information to be described later. Next, the user enters the bold lines VC through screen manipulation (GUI manipulation) by using various input devices connected to the detector circuit 2 (upon this user input, the bold lines VC are displayed). Then, the information (synthetic connection information and connection state information to be described later) corresponding to the connection information entered by the user is transmitted to each apparatus to set or alter the connection state of each connection apparatus on the mLAN system.

The external storage drive 7 has an interface to the bus 1. The external storage drive 7 may be a floppy disc drive (FDD), a hard disc drive (HDD), a magnetic optical (MO) drive, a compact disc-read only memory (CD-ROM) drive, a DVD drive or the like.

In this embodiment, it is assumed that at least HDD and CD-ROM drives are used as the external storage drive 7.

HDD is a driver for a hard disc. The hard disc stores therein control programs, a connection setting program of this embodiment, and the like. If the control programs and the like are not stored in ROM 5, they are stored in a hard disc and read into RAM 4 to allow CPU 6 to execute an operation in a similar manner to the case that the control programs and the like are stored in ROM 5. Addition, version-up and the like of the connection setting program of this embodiment and the like becomes easy.

A CD-ROM drive is an apparatus for reading the control programs, the connection setting program of this embodiment, and various data from a CD-ROM. The read control programs and the like are stored in a hard disc of HDD. Addition, version-up and the like of the control programs and the connection setting program and the like may be performed by using the CD-ROM drive.

RAM 4 has a working area for CPU 6 for storing the contents of flags, registers, and buffers, the control programs, various data and the like. ROM 5 stores various data, control programs, connection setting programs of this embodiment and the like. CPU 6 performs calculations and controls in accordance with the control programs and the like stored in ROM 5.

The timer 13 is connected to CPU 6 to supply a master clock signal, an interrupt signal and the like to CPU 6.

The IN/OUT interface 9 is used for connection to other musical instruments, acoustic instruments, computers and the like, and may be a serial interface such as RS232C and RS422, a MIDI interface, a USB (universal serial bus) interface and an IEEE1394 interface.

In this embodiment, the computer terminal PC is connected via serial ports to the connection apparatus IF1. The computer terminal PC of this embodiment has at least a serial port.

The expansion slot 10 is used for connection to various types of expansion cards or boards. If the IN/OUT interface 9 is not an IEEE1394 interface, an interface card compatible with the IEEE1394 specification may be inserted into the expansion slot 10. A tone generator such as a sound card may be inserted into the expansion slot 10.

The communication interface 8 is used for connection to a communication network 17 such as a local area network (LAN), the Internet, and a telephone line. Control programs, musical performance data and the like can be downloaded into a storage medium of the external storage drive 7 such as HDD, or into RAM 4 or the like, from another computer 19 connected via the communication network 17. The computer terminal PC as a client transmits a download request command to the computer 19 via the communication interface 8 and communication network 17 to download the control programs, various data and the like. Upon reception of this download request command, the computer 19 transmits the requested control programs, musical performance data and the like to the computer terminal PC via the communication network 17. The computer terminal PC receives the control programs, musical performance data and the like via the communication interface 8 and stores them in a storage medium of the external storage drive 7, RAM 4 or the like.

The computer terminal PC may be provided with a tone generator 14 and a sound system 15 shown in FIG. 3 to be described later. In this case, the tone generator 14 and sound system 15 are connected to the IN/OUT interface 9. A MIDI apparatus may be connected to the tone generator 14.

Figure 3:
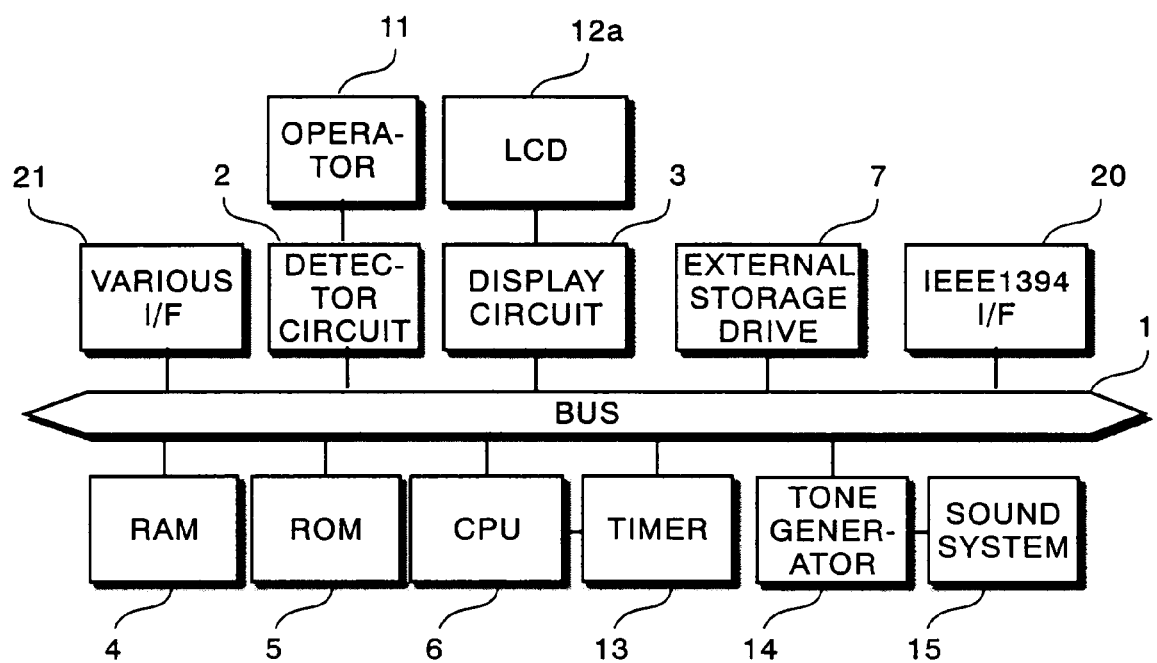
FIG. 3 is a block diagram showing the fundamental structure of a connection apparatus constituting the mLAN system shown in FIG. 1.

FIG. 3 is a block diagram showing the fundamental structure of each of the connection apparatus IF1, IF2 and IF3 constituting the mLAN system shown in FIG. 1. In FIG.

3, elements represented by identical reference numerals to those shown in FIG. 2 have basically the same structure and so the description thereof is omitted.

Similar to the computer terminal PC shown in FIG. 2, a detector circuit 2, a display circuit 3, a RAM 4, a ROM 5, a CPU 6, an external storage drive 7, a timer 13 and the like are connected to a bus 1.

The tone generator 14 is directly connected to the bus 1. The sound system 15 is connected to the tone generator 14.

The tone generator 14 generates a musical tone signal corresponding to a supplied MIDI signal or the like and supplies it to the sound system 15. The sound system 15 has a DIA converter and speakers, converts the supplied digital musical tone signal into an analog signal and produces sounds. The tone generator 14 supplies received audio data to the sound system 15 which reproduces the audio data.

The tone generator 14 may be of any type such as a waveform memory type, an FM type, a physical model type, a harmonics synthesis type, a formant type, and an analog synthesizer type of VCO+VCF+VCA.

The tone generator 14 may be made of dedicated hardware, DSP+microprograms, or CPU+software programs.

A plurality of sound channels may be formed by time-divisionally using one tone generator. A plurality of sound channels may be formed by using one tone generator per one sound channel.

An IEEE1394 interface 20 is a high speed communication interface of the IEEE1394 specification, and is connected to the bus 1. Each connection apparatus IF connects other connection apparatus IF via the IEEE1394 interfaces 20. If the computer terminal PC has an IEEE1394 interface, the connection apparatus IF may connect the computer terminal PC via the IEEE1394 interfaces 20.

Another interface 21 is used for connection to other musical instruments, acoustic instruments, computers and the like, and may by a serial interface such as RS232C and RS422, a MIDI interface, and a USB (universal serial bus) interface. A plurality of such interfaces may be provided.

An operator 11 is connected to the detector circuit 2. Any input devices may be used as the operator 11 so long as they can output a signal corresponding to a user input, such as a mouse, a keyboard, a musical instrument keyboard, and switches.

A liquid crystal display 12a is connected to the display circuit 3 to display various setting information and the like.

In this embodiment, although the connection apparatus IF has the structure described above, the structure is not limited only thereto and the connection apparatus of other types may also be used if they have the IEEE1394 interface. For example, as the connection apparatus, a computer terminal PC or an electronic musical instrument having a built-in tone generator, an automatic music performance player or the like (keyed instrument, stringed instrument, wind instrument, percussion instrument or the like) may be used as the connection apparatus. Namely, the connection apparatus IF may have a MIDI apparatus and an audio apparatus shown in FIG. 1. In this case, physical cables between the connection apparatus and the MIDI apparatus and audio apparatus are omitted.

FIGS. 4A and 4B and FIGS. 5A and 5B are lists showing the connection state of the mLAN system shown in FIG. 1, the lists being displayed on the display 12 of the computer terminal PC. The lists are displayed in accordance with the apparatus information and connection information of each apparatus. In this embodiment, for the convenience of description, it is assumed that only MIDI data and audio data are transmitted in the mLAN system. However, in practice, data to be transmitted is not limited only thereto.

The connection state of the mLAN system may be displayed as separate lists of MIDI apparatus and audio apparatus or as the single list. The two lists may be displayed side by side. Form the viewpoint of intuitive understanding of the connection state of each data type, it is preferable to display separate lists of MIDI and audio apparatus. In this embodiment, a MIDI apparatus list and an audio apparatus list are displayed separately.

FIGS. 4A and 4B are lists before a user sets the connection state, i.e., lists without the contents of the bold lines VC shown in FIG. 1. FIG. 4A is a MIDI apparatus connection list, and FIG. 4B is an audio apparatus connection list.

In both the MIDI and audio apparatus lists, the list is divided into a "from" column and a "to" column. Each column is divided into upper and lower rows by a broken line.

At the upper row of the "from" column, the apparatus (lines) connected to the mLAN system capable of transmitting data are displayed. In this embodiment, MIDI and audio apparatus are used for transferring data.

At the lower row of the "to" column, the apparatus (lines) connected to the mLAN system capable of receiving data are displayed. In this embodiment, MIDI apparatus MD2 and MD3 and audio apparatus AD2 are used for receiving data.

In a line name column, the line name specific to each apparatus is displayed which was automatically assigned when the apparatus was connected to the mLAN system.

FIGS. 5A and 5B are lists after a user sets the connection state, i.e., lists with the contents of the bold lines VC shown in FIG. 1. FIG. 5A corresponds to FIG. 4A, and FIG. 5B corresponds to FIG. 4B.

In setting or altering the connection state of each list, one or a plurality of information sets (combinations each including a line name and an apparatus name of a data receiving apparatus) are moved (copied) to the position, corresponding to the data transmitting apparatus, at the upper row in the "to" column, for example, by a mouse drag-and-drop operation. In this manner, a virtual connection is established. If the connection is to be released, the information set on the data receiving apparatus is moved to the lower row (the information set at the upper row is deleted). Setting and alteration of the connection state in the list is hereinafter called list editing.

Setting or alteration of the connection state by the list editing is stored as connection state information to be described later (FIGS. 11A and 11B), transmitted to each apparatus on the mLAN system, and stored at each apparatus.

List editing can be performed by a key input operation from a keyboard or the like. In this case, commands such as copy and move may be allocated to some keys.

In the lists shown in FIGS. 5A and 5B, a user moves the information sets of the MIDI apparatus MD2 and MD3 to the position, corresponding to the MIDI apparatus MD1, at the upper row of the "to" column, to thereby connect the MIDI apparatus MD2 and MD3 to the MIDI apparatus MD1, and moves the information set of the audio apparatus AD2 to the position, corresponding to the audio apparatus AD1, at the upper row of the "to" column, to thereby connect the audio apparatus AD2 to the audio apparatus AD1.

In this embodiment, as described above, a plurality of "to" side lines (data receiving apparatus) can be connected to one "from" side line (data transmitting apparatus). Therefore, even if the MIDI or audio apparatus has only one output terminal, this apparatus can be connected to a plurality of data receiving apparatus. Namely, even if the apparatus has a small number of terminals, it can be connected to a larger number of apparatus.

Complicated wiring (connection) can be set or altered by a simple operation of only designation on the display screen as described above.

FIGS. 6A to 6D are conceptual diagrams showing the apparatus information received at Step SA7 or the like shown in FIG. 8 to be described later. The apparatus information is recorded at each apparatus. This apparatus information is represented by a physical terminal and the name of an apparatus connected to the physical terminal. In the left column, a physical terminal or terminals are recorded, and in the right column, a name or names of apparatus connected to the physical terminals are recorded. A blank indicates no connection.

FIG. 6A is a conceptual diagram showing the apparatus information on the computer terminal PC. The computer terminal PC stores the information indicating that it has a serial port and other terminals (such as MIDI terminal) and that the connection apparatus IF1 is connected to the serial port.

FIG. 6B is a conceptual diagram showing the apparatus information on the connection apparatus IF1. The connection apparatus IF1 stores the information indicating that it has a serial port, an IEEE1394 (mLAN) 1 port, an IEEE1394 (mLAN) 2 port, a MIDIin terminal, a MIDIout terminal, an AUDIOin terminal, an AUDIOout terminal and that the computer terminal PC is connected to the serial port, the MIDI apparatus MD1 is connected to the MIDIin terminal and the audio apparatus AD1 is connected to the AUDIOin terminal.

FIG. 6C is a conceptual diagram showing the apparatus information on the connection apparatus IF2. The connection apparatus IF2 stores the information indicating that it has ports and terminals similar to those of the connection apparatus IF1 and that the connection apparatus IF1 is connected to mLAN 1, the connection apparatus IF3 is connected to mLAN 2, the MIDI apparatus MD2 is connected to the MIDIout terminal, and the audio apparatus AD2 is connected to the AUDIOout terminal.

FIG. 6D is a conceptual diagram showing the apparatus information on the connection apparatus IF3. The connection apparatus IF3 stores the information indicating that it has ports and terminals similar to those of the connection apparatus IF1 and IF2 and that the connection apparatus IF2 is connected to mLAN 2 and the MIDI apparatus MD3 is connected to the MIDIout terminal.

FIGS. 7A to 7C are conceptual diagrams of the connection information. The connection information represents the connection state of an mLAN connected apparatus on the mLAN system. Lines corresponding in number to the number of physical terminals possessed by each connection apparatus are retained and the name of each line is set without any line name contradiction between connection apparatus IF connected to the mLAN system. The line name specific to each physical terminal is assigned.

In FIGS. 7A to 7C, the left side shows each assigned line name and the right side shows a physical terminal name corresponding to each line (the physical terminal name identifying a corresponding one of physical terminals of the apparatus).

A physical terminal such as MIDIin (or AUDIOin) for inputting data from a MIDI apparatus (or audio apparatus) to the connection apparatus IF or mLAN is regarded on the mLAN system side as an (out) line for outputting the data input from the physical terminal to another physical terminal (a line corresponding to the "from" side line shown in FIGS. 4A and 4B, FIGS. 5A and 5B, and FIGS. 11A and 11B).

Therefore, the physical terminal such as MIDIin (or AUDIOin) of the connection apparatus IF is assigned a line name of MIDIout (or AUDIOout) meaning that data is transmitted (output).

Specifically, the MIDIin terminal of the connection apparatus IF1 is assigned a line name MIDIout1, and the AUDIOin terminal is assigned a line name AUDIOout1.

A physical terminal such as MIDIout (or AUDIOout) for outputting data from a MIDI apparatus (or audio apparatus) to the connection apparatus IF or mLAN is regarded on the mLAN system side as an (in) line for inputting the data from another physical terminal to the physical terminal (a line corresponding to the "to" side line shown in FIGS. 4A and 4B, FIGS. 5A and 5B, and FIGS. 11A and 11B).

Therefore, the physical terminal such as MIDIout (or AUDIOout) of the connection apparatus IF is assigned a line name of MIDIin (or AUDIOin) meaning that data is received (input).

Specifically, the MIDIout terminal of the connection apparatus IF2 is assigned a line name MIDIin2, and the AUDIOout terminal is assigned a line name AUDIOin2. The MIDIout terminal of the connection apparatus IF3 is assigned a line name MIDIin3.

By assigning a line name to each physical terminal of the connection apparatus from the viewpoint of the mLAN system, a user can intuitively understand that data transmitted from which apparatus is received at which apparatus, when the connection state (list) is displayed.

The number (such as 1 of MIDIin1) added to the end of each line name is an identifier for identifying each of a plurality of lines used on the mLAN. This identification number is not limited only to a numerical number but an alphabet or the like may also be used if it can discriminate between a plurality of lines.

In this embodiment, each connection apparatus has a pair of MIDIin/MIDIout terminals and a pair of AUDIOin/AUDIOout terminals. Therefore, a single unified number (identifier) is used in each connection apparatus. However, for example, if the connection apparatus IF1 has two MIDIout terminals, line names MIDIin1 and MIDIin2 are assigned to the two MIDIout terminals of the connection apparatus IF1, a line name MIDIin3 is assigned to the MIDIout terminal of the connection apparatus IF2, and a line name MIDIin4 is assigned to the MIDIout terminal of the connection apparatus IF3, in order not to duplicately use the same line name.

FIG. 8 is a flow chart illustrating a connection control process to be executed by CPU 6 of the computer terminal PC.

As the computer terminal PC executes a program realizing the connection control process, this process starts at Step SA1 and the flow advances to next Step SA2.

At Step SA2, an initial setting process is executed. For example, in this initial setting process, the connection state is initialized, the initial lists shown in FIGS. 4A and 4B (with blank line names and apparatus names) are displayed, and various buffers and flags are reset to thereafter advance to next Step SA3.

At Step SA3, it is checked whether a user instructs to update the list of each connection apparatus. This list update process (at Steps SA4 to SA11) is executed when a user requests the list update process. The user requests the list update process by using a list update instruction switch displayed on the display screen. If the list update is instructed, the flow advances to next Step SA4, whereas if not, the flow skips to Step SA12.

The list update process is executed in practice when the connection list is first displayed, when a new apparatus is connected to the mLAN system, or when the apparatus is disconnected from the mLAN system. This list update process is a process of confirming the current physical connection state of the mLAN system and an assignment state of line names. Under the above-described conditions, the list update process may be executed automatically.

At Step SA4, connection apparatus are detected to thereafter advance to next Step SA5. In this embodiment, since the computer terminal PC is connected to the mLAN system via the serial port, it detects only the connection apparatus IF1 directly connected to the computer terminal PC, by referring to the apparatus information shown in FIG. 6A.

At Step SA5, a request signal is transmitted to the detected connection apparatus to thereafter advance to next Step SA6. The request signal is a signal for requesting the connection apparatus to transmit the apparatus information shown in FIG. 6B and the connection information shown in FIG. 7A.

In this embodiment, since only the connection apparatus IF1 is detected, the request signal is transmitted only to the connection apparatus IF1. To the connection apparatus IF2 and IF3, the request signal is transmitted from the connection apparatus IF1.

At Step SA6, information supplied from the detected connection apparatus is received. The information acquisition process continues until the information is received completely. A completion of information reception is judged from an end command from the connection apparatus. After the information is received completely, the flow advances to next Step SA7.

In this embodiment, the computer terminal PC transmits the request signal to the connection apparatus IF1, and the connection apparatus IF1 received the request signal detects the connection apparatus IF2 and IF3 on the mLAN system and transmits a request signal to the connection apparatus IF2 and IF3. Thereafter, the connection information and apparatus information are received from the connection apparatus IF2 and IF3 and transmitted to the computer terminal PC. Thereafter, the connection apparatus IF1 transmits its connection information and apparatus information to the computer terminal PC. In this manner, the computer terminal PC acquires the information of the other connection apparatus via the connection apparatus IF1.

If the computer terminal PC is mLAN-connected, it detects all the connection apparatus on the mLAN system, transmits the request signal directly to the detected connection apparatus, and receives the connection information and apparatus information from all the connection apparatus.

At Step SA7, the information of only MIDI connections is derived from the acquired information to thereafter advance to next Step SA8.

At Step SA8, in accordance with the information derived at Step SA7, MIDI synthetic connection information such as shown in FIG. 10A is generated. Thereafter, the flow advances to next Step SA9.

At Step SA9, the information of only audio connections is derived from the acquired information to thereafter advance to next Step SA10.

At Step SA10, in accordance with the information derived at Step SA9, audio synthetic connection information such as shown in FIG. 10B is generated. Thereafter, the flow advances to next Step SA11.

The synthetic connection information is generated in accordance with the connection information and apparatus information. The synthetic connection information is generated for each type of data flowing on the mLAN system. In order to facilitate the recognition of a virtual connection state between nodes of the mLAN system on which data of a plurality of types flow, the lists such as shown in FIGS. 4A and 4B or the connection diagram shown in FIG. 1 is displayed. Setting and alteration of the connection information and apparatus information can be made, for example, by a GUI operation on the display screen.

The synthetic connection information includes a line name and the name of an apparatus connected to the line.

More specifically, as shown in FIG. 10A, the MIDI synthetic connection information is generated by deriving the information of the MIDI apparatus MD1 to MD3 (right column in FIG. 10A) connected to any of MIDI lines MIDIin1 to MIDIin3 and MIDIout1 to MIDIout3 (left column in FIG. 10A) from the apparatus information and connection information transmitted from each apparatus.

As shown in FIG. 10B, the audio synthetic connection information is generated by deriving the information of the audio apparatus AD1 and AD2 (right column in FIG. 10B) connected to any of audio lines AUDIOin to AUDIOin3 and AUDIOout1 to AUDIOout3 (left column in FIG. 10B) from the apparatus information and connection information transmitted from each apparatus.

In addition to the MIDI and audio data, if video data is to be transmitted and received, processes similar to those at Steps SA7 and SA8 (or Steps SA9 and SA10) are executed to generate video synthetic connection information.

The synthetic connection information sets same in number as the number of data types to be transmitted and received on the mLAN are generated. Namely, in order to generate n sets of synthetic connection information, processes similar to those at Steps SA7 and SA8 (or Steps SA9 and SA10) are executed n times.

As described above, the synthetic connection information is generated for each data type to be transmitted and received on the mLAN so that a list for each data type can be displayed on the display screen. A user can easily grasp the connection state of the mLAN by viewing the list for each data type displayed on the display screen.

At Step SA11, for example, the lists shown in FIGS. 4A and 4B are displayed in accordance with the synthetic connection information generated at Steps SA8 and SA10. Thereafter, the flow advances to next Step SA12 (FIG. 9).

FIG. 9 is a flow chart illustrating the connection control process to be executed by CPU 6 of the computer terminal PC after the process shown in FIG. 8 is executed.

At Step SA12, it is judged whether the user made list editing described earlier with reference to FIGS. 5A and 5B. If the list editing was made, the flow advances to next Step SA13, whereas if not, the flow skips to Step SA14.

At Step SA13, the connection state information is generated or altered to match a change in the connection state caused by the list editing at Step SA12. Thereafter, the flow advances to next Step SA14.

The connection state information is the information of a virtual connection state made by the user, and is generated from the synthetic connection information for each type of data to be transmitted and received on the mLAN. Namely, the connection state information includes the information (connection information between lines) on the virtual connection such as shown by the bold lines VC shown in FIG.

1. Each connection apparatus can judge from the connection state information whether information is required to be processed at the apparatus.

One set of MIDI connection state information is generated so as to indicate what input line is connected to which output line. More in particular, as shown in FIG. 11A, MIDI input lines MIDIin (right "to" column in FIG. 11A) are recorded at a position corresponding to a MIDI output line MIDIout (left "from" column in FIG. 11A) connected to the MIDI input lines.

In this embodiment, since MIDIout1 is connected to MIDIin2 and MIDIin3, these MIDIin2 and MIDIin3 are recorded at the position corresponding to MIDIout1.

One set of audio connection state information is generated so as to indicate what input line is connected to which output line. More in particular, as shown in FIG. 11B, an audio input line AUDIOin (right column in FIG. 11B) is recorded at a position corresponding to an audio output line AUDIOout (left column in FIG. 11B).

In this embodiment, since AUDIOout1 is connected to AUDIOin2, this AUDIOin2 is recorded at the position corresponding to AUDIOout1.

The "to" columns of FIGS. 11A and 11B correspond to the "to" columns shown in FIGS. 4A and 4B and FIGS. 5A and 5B, and the "from" columns of FIGS. 11A and 11B correspond to the "from" column shown in FIGS. 4A and 4B and FIGS. 5A and 5B.

The same connection state information is stored in all apparatuses on the mLAN system. Therefore, each time the connection state of any one of the apparatus is changed, this changed contents are transmitted to the other apparatus to maintain the integrity of the connection state information stored in each apparatus.

The connection state information may be generated from the connection information supplied from each apparatus, not from the synthetic connection information. The format of the connection state information is not limited only to that shown in FIGS. 11A and 11B, but any other formats may also be used if they can definitely show what input line is connected to which output line. Synthetic connection state information may be generated which includes both the MIDI connection state information and audio connection information.

In addition to MIDI data and audio data, if video data is to be transmitted and received, video connection state information is generated by a process similar to that at Step SA13.

If the computer terminal PC is mLAN-connected, the synthetic connection information and connection state information are generated which include the apparatus information and connection information of the computer terminal PC.

The process at Step SA14 is used for notifying all the connection apparatus on the mLAN of the changed contents of the connection state information. If the user judges that the list (connection state information) was decided, the flow advances to next Step SA15, whereas if not, the flow skips to Step SA16. Such user judgment is performed by operating upon a list decision switch on the display screen.

At Step SA15, only the altered portion of the connection state information is transmitted to each connection apparatus. At the first list decision, all the connection state information generated from the contents of list editing is transmitted. At the next and following list update, only the portion altered by list editing (altered portion of the connection state information) is transmitted to each apparatus. By transmitting only the altered portion of the connection state information, the amount of data to be transmitted can be reduced and more reliable (fewer errors) and faster communication is possible than by transmitting all connection state information. Each time the list is decided, all connection state information may be transmitted to each apparatus instead of transmitting only the altered portion.

If the connection state information is received from the connection apparatus IF at Step SA16, the flow advances to next Step SA17, whereas if not, the flow skips to Step SA19. In this embodiment, since the computer terminal PC is serially connected, the connection state information of the connection apparatus IF2 and IF3 is received from the connection apparatus IF1. Only the altered portion of the connection state information is received. All the connection state information may be received instead.

At Step SA17, the contents of the connection are changed in accordance with the connection state information received at Step SA16 to thereafter advance to next Step SA18.

At Step SA18, the updated connection state information is displayed to thereafter advance to next Step SA19.

The processes at Steps SA16 to SA18 are executed when the connection state of any one of the connection apparatus IF1 to IF3 is changed or in other cases. Namely, the altered connection state information is received from the apparatus, and in accordance with this information, the connection state information stored at the computer terminal PC is changed. Thereafter, the list or connection diagram is displayed on the display screen by using the altered connection state information.

In this embodiment, therefore, each of the connection apparatus IF1 to IF3 can alter the connection state. Alteration and transmission of the connection state of each of the connection apparatus IF1 to IF3 are executed by the processes at Steps SB11 to SB13 in the flow chart of FIG. 13 to be described later.

At Step SA19, mixers are displayed. The mixer of each of the connection apparatus (in this embodiment, connection apparatus IF1 to IF3) connected to the mLAN system is displayed on the display 12 (FIG. 2).

By using the displayed mixer, the mixing conditions of each connection apparatus can be edited. Information on the edited mixing conditions is transmitted to each connection apparatus. Upon reception of this mixing information, the connection apparatus sets or alters the mixing conditions in accordance with the received mixing information. Thereafter, the flow advances to next Step SA20.

At Step SA20, other processes are executed to thereafter advance to next Step SA21.

At Step SA21, the user judges whether the connection control process is to be terminated. If to be terminated, the flow advances to next Step SA22 whereat the connection control process is terminated. If the connection control process is not terminated, the flow returns to Step SA3 shown in FIG. 8.

Figure 12:
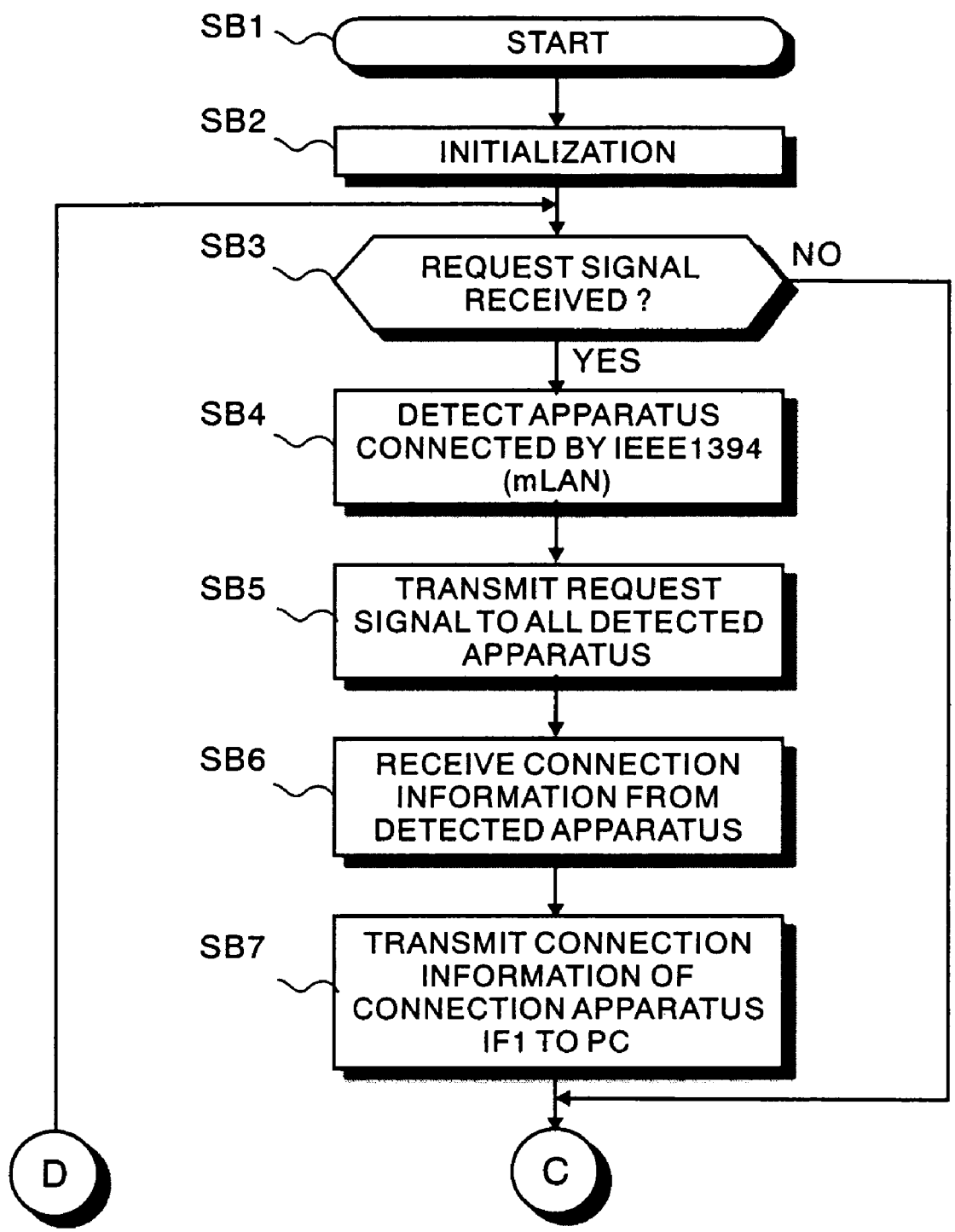
FIG. 12 is a flow chart illustrating a process to be executed by a connection apparatus.

FIG. 12 is a flow chart illustrating the process to be executed by the connection apparatus.

In this embodiment, the computer terminal PC is not equipped with an IEEE1394 (mLAN) interface. Therefore, the operation to be executed by the connection apparatus directly connected to the computer terminal PC via serial ports is slightly different from the operation to be executed by the connection apparatus IF2 and IF3.

The process by the connection apparatus IF1 will be described in the following. The processes by the connection apparatus IF2 and IF3 are the same processes to be described in the following excepting the communication with the computer terminal PC. If the computer terminal PC is connected to the connection apparatus IF1 through IEEE1394 (mLAN) connection, data can be transmitted and received directly to and from all the connection apparatus. In this case, therefore, the process by the connection apparatus IF1 is similar to the processes by the connection apparatus IF2 and IF3 to be described hereinafter.

As the connection apparatus are activated at Step SB1, a connection apparatus process starts to then advance to next Step SB2.

At Step SB2, an initializing process is executed. For example, during the initializing process, various buffers and flags are reset and the apparatus information and connection information of each connection apparatus are generated. Thereafter, the flow advances to next Step SB3. The apparatus information and connection information are generated by communicating with the connection apparatus directly connected to the computer terminal PC and the other connection apparatus on the mLAN.

At Step SB3, the connection apparatus IF receives the request signal at Step SA5 shown in FIG. 8. The connection apparatus IF1 receives this request signal directly from the computer terminal PC via the serial ports. The request signal is transmitted to the connection apparatus IF2 and IF3 from the connection apparatus IF1 via anisochronous ports of IEEE1394 (mLAN). After the request signal is received, the flow advances to next Step SB4, whereas if the request signal is not received, the flow skips to Step SB8 shown in FIG. 13.

At Step SB4, the connection apparatus IF1 detects all IEEE1394 (mLAN)connected connection apparatus to thereafter advance to next Step SB5.

At Step SB5, the connection apparatus IF1 transmits the request signal to all detected connection apparatus. Thereafter, the flow advances to Step SB6.

At Step SB6, the connection apparatus IF1 receives the apparatus information and connection information from each of the connection apparatus received the request signal. After the connection apparatus IF1 receives the information from all the connection apparatus, it transmits the received information to the computer terminal PC. Thereafter, the flow advances to next Step SB7.

Transmission/reception of the information at Steps SB4 to SB6 is performed using anisochronous ports of the IEEE1394 (mLAN).

Instead of transmitting all the information from the connection apparatus at a time, the information may be transmitted to the computer terminal PC each time the information is received from the connection terminal.

In the (initial) process to be executed immediately after the computer terminal PC is activated, all the connection information may be transmitted and at the later process only the altered portion of the information may be transmitted.

The received information may be stored at each connection apparatus. Namely, in this embodiment, each of the connection apparatus IF1 to IF3 may store the apparatus information and connection information of all the connection apparatus.

If the computer terminal PC is IEEE1394 (mLAN)-connected, Steps SB4 to SB6 are not executed at the connection apparatus IF1 to IF3 in this embodiment, but the computer terminal PC receives the apparatus information and connection information directly from all the connection apparatus. Namely, the apparatus issued the request signal transmits and receives various data directly to and from other apparatus.

Figure 13:
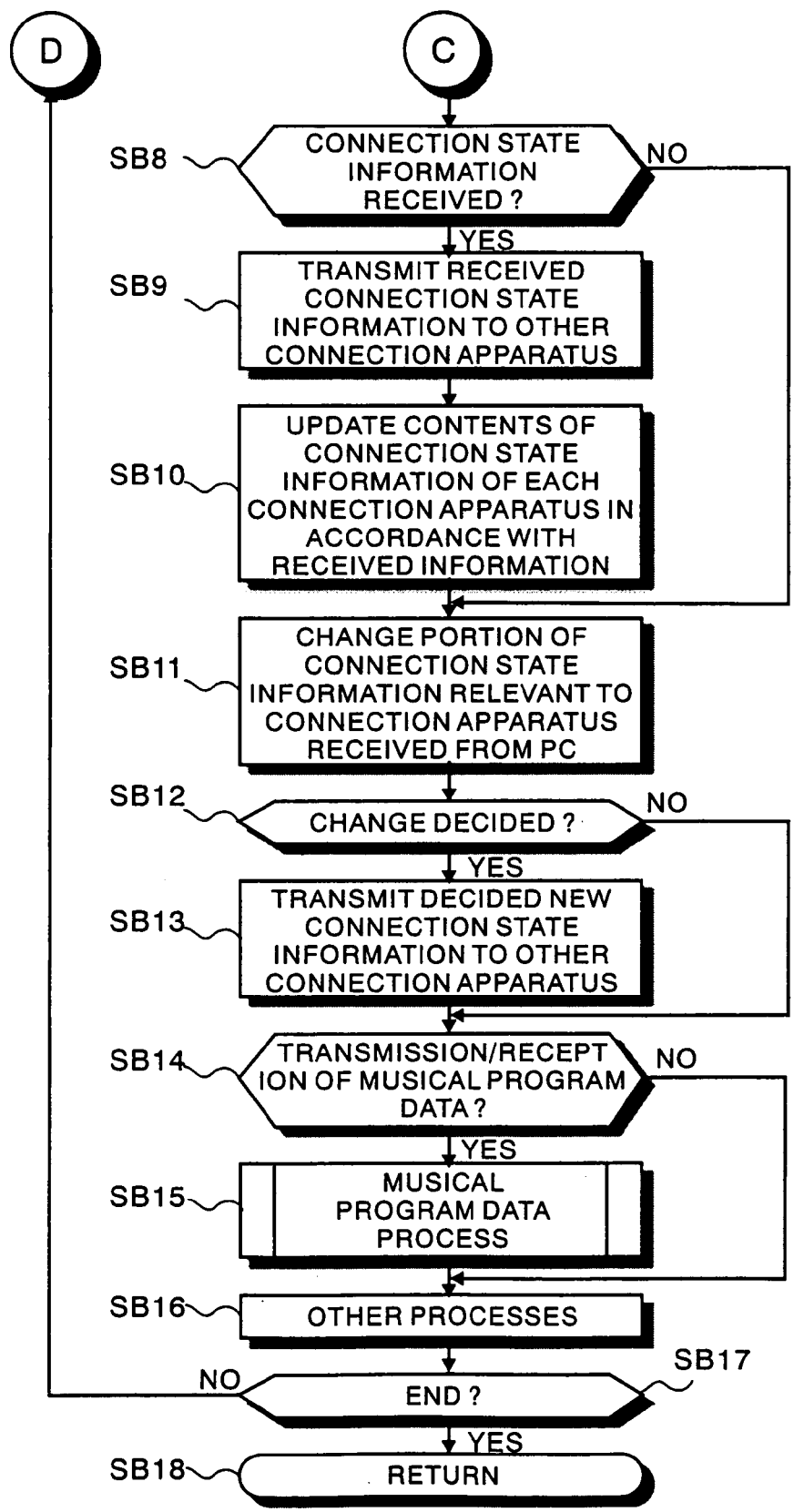
FIG. 13 is a flow chart illustrating a process to be executed by the connection apparatus.

At Step SB7, the connection apparatus IF1 transmits its own apparatus information and connection information to thereafter advance to next Step SB8 (FIG. 13). In this case, an end signal representative of a completion of data transmission is also transmitted. If the computer terminal PC is IEEE1394 (mLAN)-connected, the connection apparatus IF2 and IF3 also transmit the connection information and other information directly to the computer terminal PC at this Step SB8.

FIG. 13 is a flow chart illustrating the process to be executed by the connection apparatus after the process shown in FIG. 12 is executed.

At Step SB8, the connection apparatus IF receives the connection state information transmitted from the computer terminal PC, the connection state information having been changed by using the list displayed on the display screen or being the connection state information initially transmitted. If the connection state information is received, the flow advances to next Step SB9, whereas if not, the flow skips to Step SB11.

At Step SB9, the connection apparatus FI1 transmits the connection state information received at Step SB8 to the other connection apparatus IF2 and IF3 on the mLAN. After the connection state information is transmitted, the flow advances to next Step SB10.

At Step SB10, in accordance with the received connection state information, the contents of the connection state information stored at each connection apparatus are renewed (or the received content state information is newly stored). It is therefore possible for each connection apparatus to judge which data flowing on the mLAN system is to be processed at the connection apparatus. It is desired to acquire only the portion of the received connection state information relevant to each connection apparatus and store it. It is therefore possible for each connection apparatus to quickly judge which data flowing on the mLAN system is to be processed. The flow thereafter advances to next Step SB11.

In this embodiment, the process at Step SB9 is a process to be executed by the connection apparatus IF1 which receives the connection state information transmitted from the computer terminal PC at Step SA15 shown in FIG. 9 and transmits it to the other connection apparatus IF2 and IF3. This Step SB9 is therefore not executed by the connection apparatus IF2 and IF3.

At Step SB11, the portion of the connection state information relevant to the connection apparatus IF1 is changed by using the operator 11 or the like provided in advance in the connection apparatus. Thereafter, the flow advances to Step SB12.

At Step SB12, if the user judges that the connection state information was decided, the flow advances to Step SB13. If the connection state information is not decided because of a change cancel or other reasons, the flow skips to Step SB14. The user judgement is made by operating upon a preset decision switch or the like.

At Step SB13, the new connection state information decided at Step SB12 is transmitted to the other connection apparatus to thereafter advance to next Step SB14.

The processes at Steps SB11 to SB13 may be used for changing the portion of the connection state information relevant to other connection apparatus on the mLAN system. In this case, each connection apparatus stores the connection information and apparatus information of the other connection apparatus on the mLAN system.

The apparatus information and connection information of each connection apparatus may be transmitted to all connection apparatus on the mLAN system when information of various types is changed, such as initialization, list decision, change decision, and physical connection change (addition of new apparatus, disconnection of apparatus, or the like).

At Step SB14, it is judged whether transmission/reception of musical program data is requested or whether the user designates transmission/reception of musical program data. If transmission/reception of musical program data is to be performed, the flow advances to next Step SB15, whereas if not, the flow skips to Step SB16.

At Step SB15, a process for musical program data is executed. This musical program data process is divided into a transmission process and a reception process. Since musical program data is processed as the isochronous data, transmission/reception of musical program data is performed by using isochronous ports.

Musical program data is generated from input data to a MIDI apparatus MD1 or audio apparatus AD1, and transmitted from the apparatus by adding the apparatus name and the name of a line to be used for transmission to the musical program data, the apparatus name and line name being acquired by referring to the connection information of the apparatus.

Each apparatus refers to the apparatus name and line name added to the musical program data to judge whether the musical program data is received at the apparatus. If it is judged that the musical program data is to be received at the apparatus, for example, the data is transmitted to the MIDI apparatus MD2 and MD3 and audio apparatus AD2 whereat processes such as recording and reproduction are executed to thereafter advance to next Step SB16.

At Step SB16, other processes are executed to thereafter advance to next Step SB17. The other processes include a process of updating the connection information if the connection of each apparatus is changed and transmitting the updated connection information to the other apparatus.

At Step SB17, the user judges whether the connection apparatus process is to be terminated. If it is judged that the process is to be terminated, the flow advances to next Step SB18 whereat the connection apparatus process is terminated. If the connection apparatus process is not terminated, the flow returns to Step SB3 shown in FIG. 12.

In this embodiment, the computer terminal PC is used only for controlling the connection state. If the computer terminal PC and connection apparatus IF1 are mLAN-connected, the computer terminal PC can process and transmit/receive musical program data similar to the case of the connection apparatus IF1 to IF3, in addition to the control of the connection state.

The computer terminal PC may be directly connected to a MIDI apparatus or audio apparatus. The computer terminal PC may generate and reproduce musical tones. In this case, the line name is assigned by taking into consideration the apparatus and the like connected to the computer terminal PC, and in accordance with the assigned line names, the connection state information and synthetic connection information are generated.

The connection apparatus IF (tone generator 14 connected to the bus 1) may perform generation, reproduction and the like of musical tones. In this case, the line name is assigned by taking into consideration the tone generator 14 and the like connected to the connection apparatus, and in accordance with the assigned line names, the connection state information and synthetic connection information are generated.

The number of channels used by IEEE1394 (mLAN) is not limited only to the number used by the embodiment, but it is preferably set to the number of terminals of apparatus connected to the mLAN system (if the computer terminal PC and connection apparatus IF perform generation, reproduction and the like of musical program data, the number of terminals of apparatus used for this purpose is added).

The invention may be embodied by using a commercially available general purpose computer or personal computer installed with computer programs and the like realizing the function of the embodiment.

In this case, a computer readable storage medium storing the computer programs and the like realizing the embodiment function may be distributed to users.

If the general purpose computer or personal computer is connected to a communication network such as a LAN, the Internet and a telephone line, the computer programs, various data and the like may be supplied via the communication network to the general purpose computer or personal computer.

The present invention has been described in connection with the preferred embodiments. The invention is not limited only to the above embodiments. It is apparent that various modifications, improvements, combinations, and the like can be made by those skilled in the art.

What we claim are:

1. A connection setting apparatus that can display and edit a virtual connection between nodes in a network system wherein a plurality of data types are transmitted, the connection setting apparatus comprising:
   an acquiring device that acquires connection information from all nodes connected to the network system;
   a generator that generates synthetic connection information that can display all of the lines in the network system by using the connection information acquired from all the nodes;
   a memory that stores connection state information representing virtual connections in the network system for each data type;
   an editor that edits the virtual connections by using the synthetic connection information;
   an altering device that alters the connection state information in accordance with a change made by the editor;
   a transmitter that transmits the altered connection state information to the other nodes to make the other nodes establish virtual connections in accordance with the altered connection state information; and
   a display controller that controls display of the virtual connections for each data type in accordance with the altered connection state information by using the synthetic connection information.

2. The connection setting apparatus according to claim 1, wherein the plurality of data types are MIDI data and audio data.

3. The connection setting apparatus according to claim 1, further comprising a detector that detects an update instruction from a user, and wherein
   the acquiring device acquires the connection information when the detector detects the update information.

4. The connection setting apparatus according to claim 1, wherein the connection information represents lines for each data type equipped by each node.

5. The connection setting apparatus according to claim 1, further comprising a display that displays a synthetic connection in the network system for each data type in accordance with the generated synthetic connections information.

6. The connection setting apparatus according to claim 5, wherein the synthetic connection is displayed by dividing display regions into a group of transmitting lines and a group of receiving lines.

7. The connection setting apparatus according to claim 6, wherein the editor edits the virtual connections with the displayed synthetic connections by selecting one line from the group of transmitting lines and another line from the group of receiving lines to make a relationship between the selected two lines.

8. A connection setting apparatus that can display and edit a virtual connection between nodes in a network system, the connection setting apparatus comprising:
- an acquiring device that acquires connection information from all nodes connected to the network system;
- a generator that generates synthetic connection information that can display all of the lines in the network system by using the connection information acquired from all the nodes;
- a memory that stores connection state information representing virtual connections in the network system;
- an editor that edits the virtual connections by using the synthetic connection information;
- a first altering device that alters the connection state information in accordance with a change made by the editor;
- a transmitter that transmits the altered connection state information to the other nodes to make all of the other nodes store the same altered connection state information and establish virtual connections in accordance with the altered connection state information;
- a receiver that receives connection state information from other nodes;
- a second altering device that alters the connection state information stored in the memory in accordance with the received connection state information; and
- a display controller that controls display of the virtual connections in accordance with the connection state information altered by the first or the second altering device by using the synthetic connection information.

9. The connection apparatus according to claim 8, further comprising the detector that detects an update instruction from a user, and wherein
the acquiring device acquires the connection information when the detector detects the update information.

10. The connection setting apparatus according to claim 8, wherein the connection information represents lines equipped by each node.

11. The connection setting apparatus according to claim 8, further comprising a display that displays a synthetic connection in the network system in accordance with the generated connections information.

12. The connection setting apparatus according to claim 11, wherein the synthetic connection is displayed by dividing display regions into a group of transmitting lines and a group of receiving lines.

13. The connection setting apparatus according to claim 12, wherein the editor edits the virtual connections with the displayed synthetic connections by selecting one line from the group of transmitting lines and another line from the group of receiving lines to make a relationship between the selected two lines.

14. A program which a computer executes to realize a connection setting apparatus that can display and edit a virtual connection between nodes in a network system wherein a plurality of data types are transmitted, the program comprising the instructions for:
- (a) acquiring connection information from all nodes connected to the network system;
- (b) generating synthetic connection information that can display all of the lines in the network system by using the connection information acquired from all the nodes;
- (c) storing connection state information representing virtual connections in the network system for each data type in a memory;
- (d) editing the virtual connections by using the synthetic connection information;
- (e) altering the connection state information in accordance with a change made by the editing instruction (d);
- (f) transmitting the altered connection state information to the other nodes to make the other nodes establish virtual connections in accordance with the altered connection state information; and
- (g) controlling display of the virtual connections for each data type in accordance with the altered connection state information by using the synthetic connection information.

15. A program which a computer executes to realize a connection setting apparatus that can display and edit a virtual connection between nodes in a network system, the program comprising the instructions for:
- (a) acquiring connection information from all nodes connected to the network system;
- (b) generating synthetic connection information that can display all of the lines in the network system by using the connection information acquired from all the nodes;
- (c) storing connection state information representing virtual connections in the network system;
- (d) editing the virtual connections by using the synthetic connection information;
- (e) altering the connection state information in accordance with a change made by the editing instruction (d);
- (f) transmitting the altered connection state information to the other nodes to make all of the other nodes store the same altered connection state information and establish virtual connections in accordance with the altered connection state information;
- (g) receiving connection state information from other nodes;
- (h) altering the connection state information stored in the memory in accordance with the received connection state information; and
- (i) controlling display of the virtual connections in accordance with the connection state information altered by the altering instruction (e) or (h) by using the synthetic connection information.

* * * * *